(12) United States Patent
Zhu et al.

(10) Patent No.: US 12,158,247 B2
(45) Date of Patent: Dec. 3, 2024

(54) LIGHTING DEVICE

(71) Applicant: SAVANT TECHNOLOGIES LLC, East Cleveland, OH (US)

(72) Inventors: Ruojian Zhu, Shanghai (CN); Qianchun Mao, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 18/298,909

(22) Filed: Apr. 11, 2023

(65) Prior Publication Data

US 2023/0324012 A1 Oct. 12, 2023

(30) Foreign Application Priority Data

Apr. 11, 2022 (CN) .......................... 202220824099.7

(51) Int. Cl.
*F21K 9/237* (2016.01)
*F21Y 105/18* (2016.01)
*F21Y 113/10* (2016.01)

(52) U.S. Cl.
CPC ........... *F21K 9/237* (2016.08); *F21Y 2105/18* (2016.08); *F21Y 2113/10* (2016.08)

(58) Field of Classification Search
CPC . F21K 9/233; F21K 9/237; F21K 9/69; Y02B 20/40
See application file for complete search history.

(56) References Cited

U.S. PATENT DOCUMENTS

| 6,474,837 | B1 * | 11/2002 | Belliveau | F21V 14/08 |
| | | | | 362/232 |
| 7,845,824 | B2 | 12/2010 | Robotham | |
| 8,550,657 | B2 | 10/2013 | Quach | |
| 8,630,049 | B2 | 1/2014 | Bornhorst | |
| 8,632,208 | B2 | 1/2014 | Choong | |
| 9,759,845 | B2 | 9/2017 | Bornhorst | |
| 11,096,254 | B1 | 8/2021 | Wang et al. | |
| 2008/0273324 | A1 * | 11/2008 | Becker | F21V 14/06 |
| | | | | 362/237 |
| 2011/0095687 | A1 * | 4/2011 | Jonsson | F21V 3/02 |
| | | | | 29/592.1 |

(Continued)

FOREIGN PATENT DOCUMENTS

| CN | 102620169 A | 8/2012 |
| CN | 103712109 A | 4/2014 |

(Continued)

*Primary Examiner* — Zheng Song
(74) *Attorney, Agent, or Firm* — WOOD IP LLC

(57) ABSTRACT

Provided is a lighting device that includes a light source assembly having at least two light sources with different light emitting characteristics, turned on and turned off independently to emit a light beam by one light source of the at least two light sources; a lens module, arranged on a light path of the light beam to receive the light beam; and an optical component, arranged on the light path to receive the light beam from the lens module, he optical component has a first light exiting portion and a second light exiting portion, and can move relative to the light source assembly, so that the light beam is exited from one of them, and a beam angle of the light beam exited from the first light exiting portion is different from the beam angle of the light beam exited from the second light exiting portion.

20 Claims, 6 Drawing Sheets

(56) References Cited

U.S. PATENT DOCUMENTS

| | | | | |
|---|---|---|---|---|
| 2012/0091917 | A1* | 4/2012 | Vinther | H05B 45/00 |
| | | | | 315/312 |
| 2013/0107513 | A1* | 5/2013 | Lundberg | F21V 14/06 |
| | | | | 362/231 |
| 2014/0085886 | A1* | 3/2014 | Kothmeier | F21V 5/008 |
| | | | | 362/237 |
| 2014/0301071 | A1* | 10/2014 | Jorgensen | F21V 14/06 |
| | | | | 362/231 |
| 2016/0161102 | A1* | 6/2016 | Chou | F21K 9/20 |
| | | | | 362/249.02 |
| 2016/0215961 | A1* | 7/2016 | Kjeldsen | F21V 13/02 |
| 2018/0306412 | A1* | 10/2018 | Halliwell | F21V 17/02 |
| 2021/0018147 | A1* | 1/2021 | Liu | F21K 9/237 |
| 2021/0262636 | A1 | 8/2021 | Pyshos et al. | |
| 2021/0329766 | A1* | 10/2021 | Cao | H05B 47/105 |
| 2024/0077190 | A1* | 3/2024 | Wu | F21V 23/005 |

FOREIGN PATENT DOCUMENTS

| | | |
|---|---|---|
| CN | 103712182 A | 4/2014 |
| CN | 111271662 A | 6/2020 |
| CN | 211289622 U | 8/2020 |
| CN | 212361650 U | 1/2021 |
| WO | 2020228315 A1 | 11/2020 |

* cited by examiner

Light spot with a color temperature of 3000K and a beam angle of 15° at 0.5m

Light spot with a color temperature of 5000K and a beam angle of 15° at 0.5m

Light spot with a color temperature of 3000K and a beam angle of 40° at 0.5m

Light spot with a color temperature of 5000K and a beam angle of 40° at 0.5m

LIGHTING DEVICE

CROSS-REFERENCE TO RELATED APPLICATIONS

This application claims the benefit of Chinese Patent Application Serial Number 202220824099.7, filed Apr. 11, 2022, which is herein incorporated by reference.

DESCRIPTION

Field of Technology

The present application generally relates to the technical field of lighting, and in particular, to a lighting device capable of realizing multiple color temperatures and switching beam angles.

Background

Recently, lighting devices with various lighting colors are more and more favored by people. Light sources with different color temperatures can create different light environment effects and light colors, thus bringing people a good sense of experience. At present, LED light sources are widely used due to the advantages of energy saving and environmental protection. In addition, the maximum advantage of the LED light sources is that they can be intelligently controlled. Not only can the brightness of the LED light sources be adjusted, but the color temperatures can also be adjusted.

In addition, in the lighting industry, a beam angle refers to an angle between the center line of a light beam and the line where when the light intensity is reduced to 50% of the maximum light intensity of the center line, which specifically reflects the light spot size and light intensity of the lighting device. Even if the same light source will generate different lighting effects when different beam angles are utilized, generally, the greater the beam angle is, the weaker the intermediate light intensity is, the smaller the light spot is, the worse the light scattering effect is, and the weaker the ambient light is. In a lighting application scenario, according to different situations, it is required that the lighting device has different lighting effects, for example, by adjusting the beam angle of the lighting device. In an existing lighting device, the beam angle is usually adjusted by adjusting the distance between the LED light source and a lens, but this adjustment mechanism is complex, the adjustment accuracy is poor, and optical devices are damaged easily, thereby shortening the service life of the lighting device.

US20210262636A1 discloses a system, which can configure a lighting lamp for providing a selected color temperature, a selected lumen output or a selected luminosity distribution. The lamp can include at least two light sources with different lighting characteristics, for example, different color temperatures, different lumen outputs or different luminosity distributions. The system can configure the lamp to operate a first of the two light sources, a second of the two light sources, or both light sources on the basis of an input. When the lamp is configured to operate the two light sources, the lamp can generate lighting with a different color temperature, a different lumen output or a different luminosity distribution from that of any of the two light sources.

US8632208B2 relates to a method of producing white lighting with a desired correlated color temperature (CCT) by means of a processing apparatus that instructs several lighting device groups, wherein each lighting device group has a different CCT range, that is arranged together to provide fixed CCT lighting, and the lighting device groups include a dominant wavelength (DWL) range of 585 nm and 595 nm representing amber, a CCT range of 2500K and 3700K representing warm white and a CCT range of 3700K and 5000K representing white and a CCT range of 5000K and 7000K representing cool white.

WO2020228315A1 provides a zoom PAR lamp and an implementation method therefor. The zoom PAR lamp includes a shell, a lamp cap is connected to the bottom of the shell, a driving circuit is arranged inside the shell, a heat dissipation seat is arranged inside the shell, a COB light source frame is connected inside the heat dissipation seat, a COB light source is arranged inside the COB light source frame and is connected to the driving circuit, a lens frame and the COB light source frame can move up and down relative to each other, and a lens is arranged inside the lens frame.

CN111271662A discloses a PAR lamp with an adjustable light beam, including a shell, wherein a lamp cap is connected to a lower end of the shell, a driving circuit board is arranged inside the shell, a light source board is arranged above the driving circuit board, the driving circuit board is electrically connected to the lamp cap and the light source board respectively, a lens is connected above the shell, an escape slot is formed in a side edge of an upper edge opening of the shell, a buckle corresponding to the escape slot is connected to the lens, a single thread is connected to a location that is located on the side edge of the upper edge opening of the shell and on one side of the escape slot, and a thread group corresponding to the single thread is arranged on the lens.

CN212361650U discloses an LED lamp with an adjustable beam angle, including a sleeve, a lamp cap, a heat sink, a reflection cup, a lens and a light source board, wherein one end of the sleeve is provided with external threads, and one end is provided with internal threads; the lamp cap is screwed with the internal threads of the sleeve; the heat sink is connected to the internal threads of the sleeve; the reflection cup is installed inside the heat sink; the lens is installed on one end of the heat sink away from the sleeve; and the light source board is fixed on an external thread end of the sleeve, the light source board is located inside the reflection cup, and the light source board moves inside the reflection cup with the spiral motion of the sleeve, so as to change the distance relative to the lens to change the beam angle.

US7845824B2 discloses a lamp that allows a user to adjust parameters to control the emitted white light, in particular the amount, intensity and color temperature. Under this control, the lamp can match, complement or enhance ambient light or available natural light or artificial light.

In the above prior arts, the switching of the light beam using an optical device is mainly realized by a telescopic motion (changing the distance between the lens and the LED), while the change in the CCT is realized by a control (electronic)/switch. However, there is no lighting device that can simultaneously adjust the color temperature and switch different beam angles in the prior art.

At present, if the user desires to have lamps with different beam angles or color temperatures, he/she needs to purchase a plurality of lamps. Although there are lamps with switchable beam angles and lamps with switchable color temperatures, no lamps with switchable beam angles and color temperatures are provided in the prior art yet.

Therefore, in view of the above problems, there is a need to improve the existing lighting devices, so as to provide a lighting device, which eliminates complex components/electronic devices and realizes desired beam angle/CCT changes.

SUMMARY

The present utility model discloses a lighting device, which can simultaneously realize desired beam angle/CCT changes with a simple structure, so as to meet the requirements on multiple various selections of CCTs and beam angles.

According to one aspect of the present utility model, a lighting device is provided, including: a light source assembly, having at least two light sources, wherein the at least two light sources have different light emitting characteristics, and can be turned on and turned off independently to emit a light beam by one light source of the at least two light sources; a lens module, arranged on a light path of the light beam to receive the light beam from the one light source; and an optical component, arranged on the light path of the light beam to receive the light beam emitted from the lens module, wherein the optical component has a first light exiting portion and a second light exiting portion, and can move relative to the light source assembly, so that the light beam is emitted from one of the first light exiting portion and the second light exiting portion, and a beam angle of the light beam exited from the first light exiting portion is different from the beam angle of the light beam exited from the second light exiting portion.

According to one embodiment, the at least two light sources have different color temperatures.

According to an embodiment, the at least two light sources include a first light source and a second light source, the first light source has a first color temperature, the second light source has a second color temperature that is different from the first color temperature, and the first light source and the second light source are alternately arranged in a ring array.

According to an embodiment, the optical component can be rotatable relative to the light source assembly by a predetermined angle, and at the predetermined angle, the first light source or the second light source that emits the light beam is aligned with one of the first light exiting portion and the second light exiting portion of the optical component.

According to an embodiment, the first light exiting portion is a scattering portion, and the second light exiting portion is a transmitting portion. For example, the beam angle of the light beam emitted from the first light exiting portion is 40 degrees, and the beam angle of the light beam emitted from the second light exiting portion is 15 degrees.

According to an embodiment, the optical component includes: a plate-shaped portion, the plate-shaped portion has a first surface facing to the lens module and a second surface opposite to the first surface, and the plate-shaped portion includes the first light exiting portion and the second light exiting portion, which are alternately arranged in the ring array.

According to an embodiment, the optical component further includes a first peripheral wall, which extends toward the lens module on a circumference of the plate-shaped portion.

According to an embodiment, the optical component further includes a rotary knob portion arranged at the center of the second surface of the plate-shaped portion.

According to an embodiment, the optical component further includes: a first hollow cylindrical portion arranged at the center of the first surface of the plate-shaped portion, and the first hollow cylindrical portion is opposite to the rotary knob portion.

According to an embodiment, the lighting device further includes: a supporting member arranged between the lens module and the optical component, and the supporting member includes: a supporting plate having a first surface and a second surface, wherein the first surface of the supporting plate is facing to the lens module, and the second surface of the supporting plate is opposite to the first surface of the supporting plate; and a second peripheral wall, which extends toward an opposite direction of the lens module on the circumference of the supporting plate and is used for surrounding the first peripheral wall, wherein the first peripheral wall abuts against the inner surface of the second peripheral wall and cooperates with the second peripheral wall, so that the optical component can be rotatable relative to the light source assembly by the predetermined angle, and the light beam is emitted from one of the first light exiting portion and the second light exiting portion.

According to an embodiment, one of the first peripheral wall and the second peripheral wall is provided with a limiting member, and the other of the first peripheral wall and the second peripheral wall is provided with a notch with a predetermined length, so that the limiting member can move within the notch for the predetermined length, and the optical component can be rotatable relative to the light source assembly by the predetermined angle.

According to an embodiment, the supporting member further includes: a second hollow cylindrical portion arranged at the center of the second surface of the supporting plate, and the first hollow cylindrical portion is inserted into the second hollow cylindrical portion.

According to an embodiment, the outer surface of the peripheral wall of the first hollow cylindrical portion is provided with a first sawtooth portion, the inner surface of the peripheral wall of the second hollow cylindrical portion is provided with a second sawtooth portion, and the first sawtooth portion and the second sawtooth portion can be engaged with each other.

According to an embodiment, the supporting member further includes a flange extending outward from the end portion of the second peripheral wall, a groove is arranged at the joint between the flange and the end portion of the second peripheral wall, and a sealing ring is arranged in the groove.

According to an embodiment, the lighting device further includes a shell, and the light source assembly, the lens module and the optical component are accommodated in the shell.

According to an embodiment, the shell supports the optical component to rotate relative to the light source assembly.

According to an embodiment, a switching element is arranged on the outer surface of the shell, and the switching element is electrically connected to the light source assembly, so that the at least two light sources can be turned on and turned off independently.

According to an embodiment, the lighting device further includes a heat sink, the light source assembly is arranged on the heat sink, and the peripheral wall of the heat sink can reflect the light beam emitted from the light source assembly.

According to an embodiment, the light source assembly includes M light source groups arranged in a ring array, the at least two light sources include N light sources, each light source includes M/N light source groups and is alternately arranged, wherein N is greater than or equal to 2, M/N is an integer, and the optical component can be rotated relative to the light source assembly by an angle of 360 degrees divided by M, so that the light beam is exited from one of the first light exiting portion and the second light exiting portion.

The lighting device according to the present application can meet the requirements of people for multiple change selection on combination of color temperatures and beam angles in a simple operation mode. For example, the switching of light source assemblies with different color temperatures can be realized by operating a switch, one of the first light exiting portion and the second light exiting portion in the optical component is changed to be aligned with a lighted light source by rotating a rotary knob, so as to realize different beam angles, and then a light emitting solution combining different beam angles with different color temperatures is realized.

Figure 1:
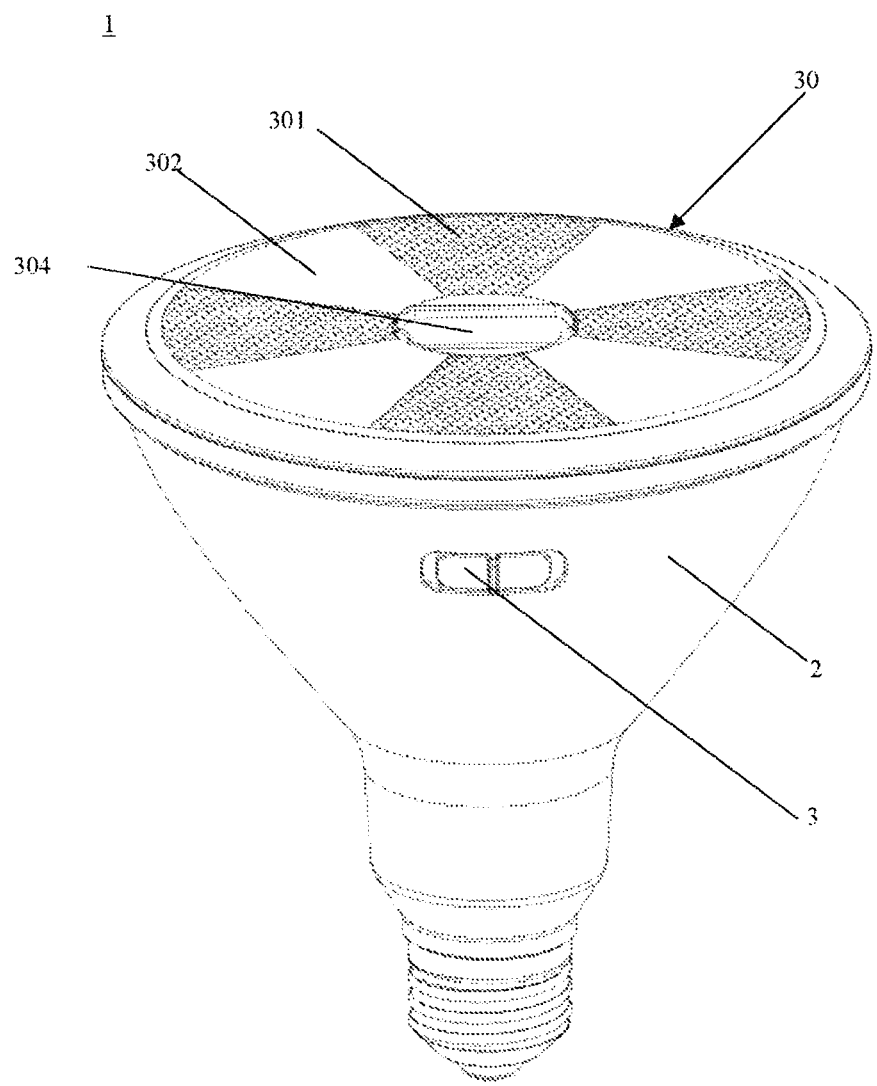
FIG. 1 is a front view showing a lighting device according to one embodiment of the present application.

The present application allows different modification and replacement forms, but specific examples have been shown by way of example in the drawings and will be described in detail herein. However, it should be understood that, the present application is not intended to be limited to the particular forms disclosed. On the contrary, the intention is to cover all modifications, equivalents and substitutions falling within the scope of the present application.

DETAILED DESCRIPTION

The implementation of a "lighting device" disclosed in the present application will be illustrated by way of particular specific embodiments, and those skilled in the art can understand the advantages and effects of the present application from the content disclosed in the present specification. The present application can be implemented or applied by other different specific embodiments, and various details in the present specification can also be modified and changed based on different viewpoints and applications without departing from the concept of the present application. In addition, the drawings of the present application are only for simple schematic illustration, and are not drawn according to the actual size.

It should be understood that, although the terms "first", "second", "third" and the like may be used herein to describe various elements, these elements should not be limited by these terms. These terms are primarily used for distinguishing one element from another.

FIG. 1 to FIG. 5 are views showing a lighting device according to one embodiment of the present application, and the structure of the lighting device according to one embodiment of the present application will be described in detail below with reference to FIG. 1 to FIG. 5.

Figure 2:
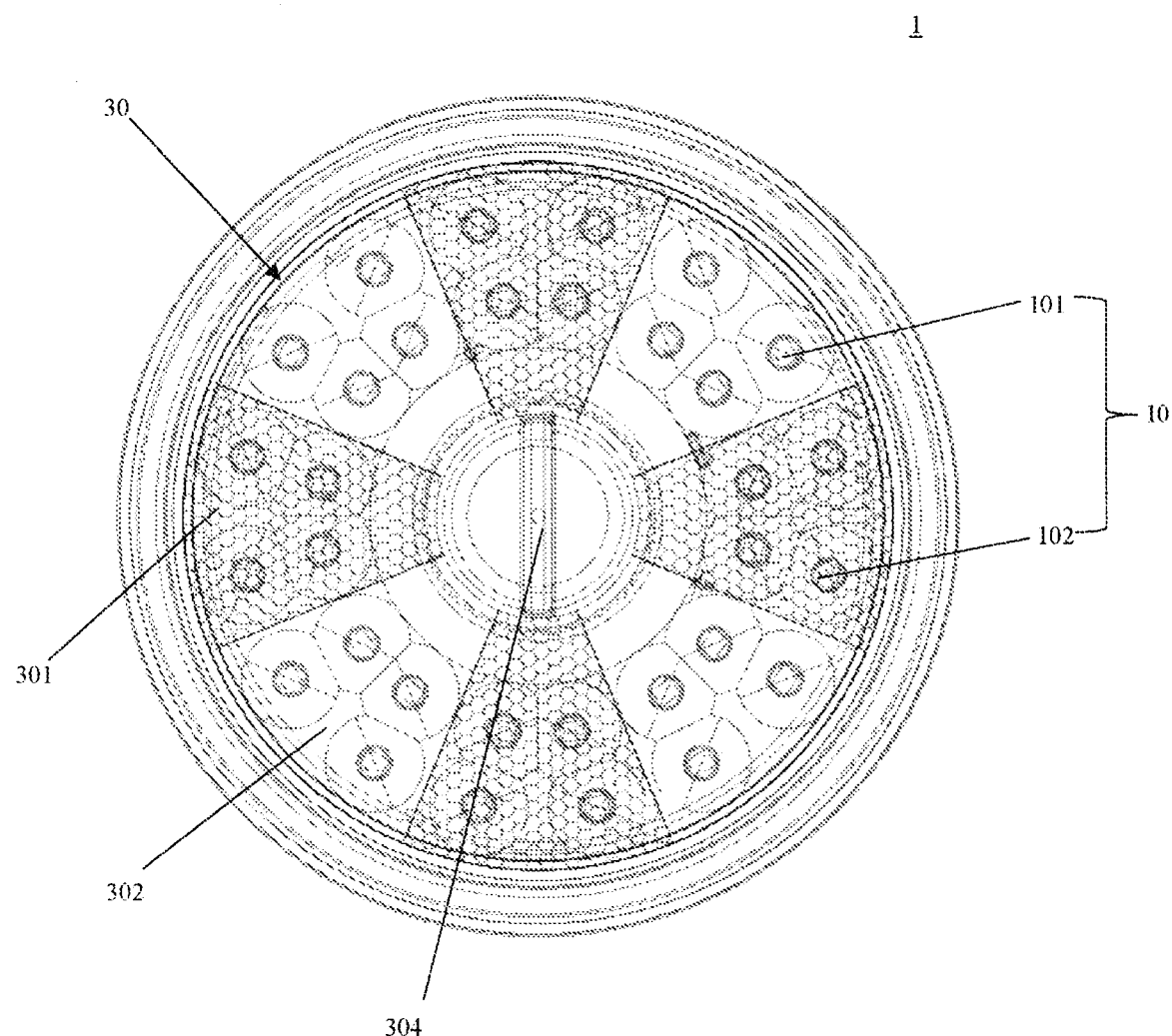
FIG. 2 is a top view showing a lighting device according to one embodiment of the present application.
Figure 3:
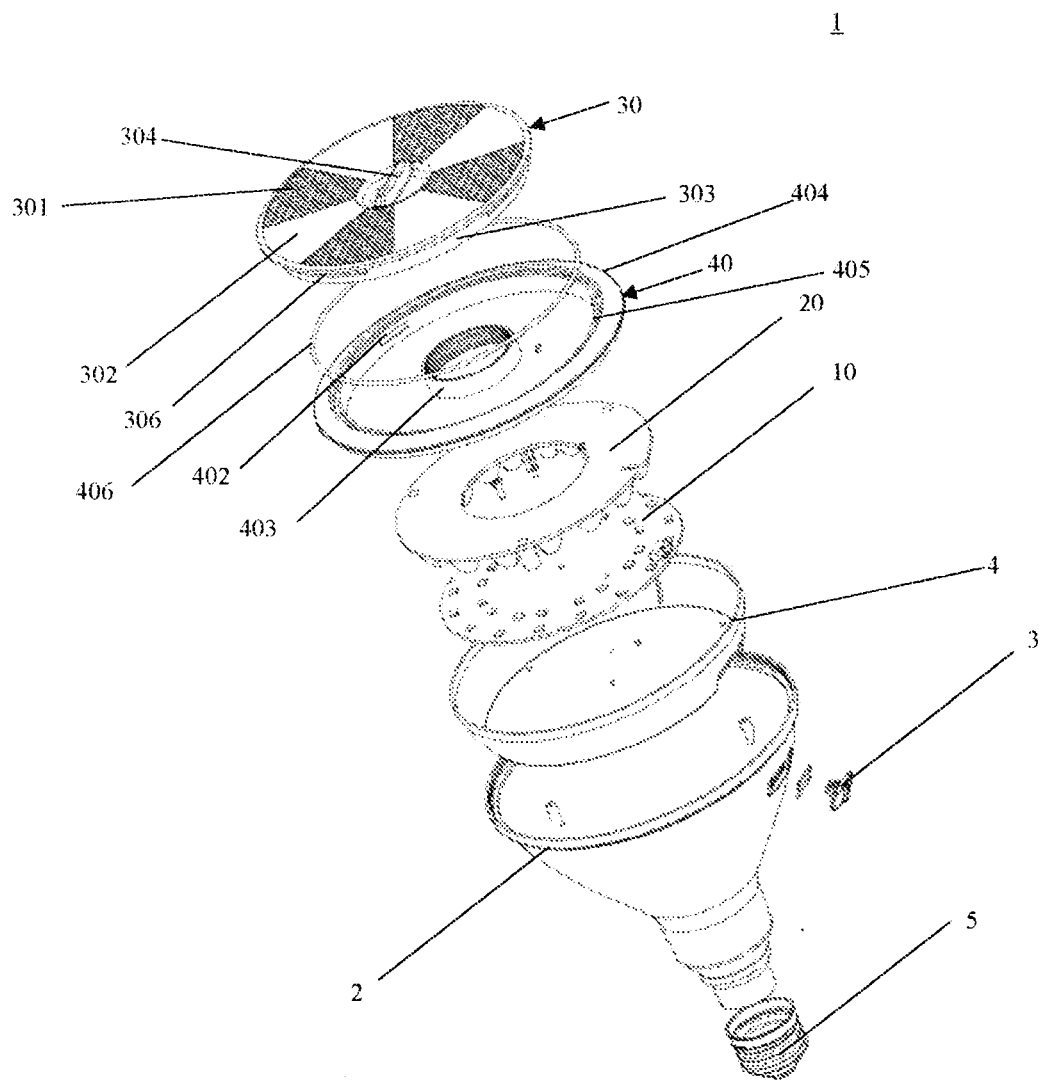
FIG. 3 is an exploded view showing a lighting device according to one embodiment of the present application.

FIG. 1 is a front view showing a lighting device according to one embodiment of the present application, FIG. 2 is a top view showing a lighting device according to one embodiment of the present application, and FIG. 3 is an exploded view showing a lighting device according to one embodiment of the present application. As shown in FIG. 1 to FIG. 3, the lighting device 1 can include a light source assembly 10, having at least two light sources which have different light emitting characteristics and can be turned on and turned off independently to allow one of the at least two light sources to emit a light beam; a lens module 20 which is arranged on a light path of the emitted light beam to receive the light beam from the turned on light source and guide and propagate the light beam; and an optical component 30 which is also arranged on the light path of the light beam, and receives the light beam propagated by the lens module 20, the optical component 30 has a first light exiting portion 301 and a second light exiting portion 302, and can move relative to the light source assembly 10, so that the light beam is exited from one of the first light exiting portion 301 and the second light exiting portion 302, and a beam angle of the light beam exited from the first light exiting portion 301 is different from the beam angle of the light beam exited from the second light exiting portion 302.

In the present embodiment, the at least two light sources can have different color temperatures. As shown in FIG. 2, for example, the light source assembly 10 includes 8 groups of light sources in total, wherein 4 groups of light sources form a first light source 101 with a first color temperature, and the remaining 4 groups of light sources form a second light source 102 with a second color temperature, each group of light sources of the first light source 101 and each group of light sources of the second light source 102 are alternately arranged in a ring array, and can be turned on and turned off independently by switches, so that one of the first light source 101 and the second light source 102 is turned on to emit a light beam. As an example, the first light source 101 can have a color temperature of 5000K, and the second light source 102 can have a color temperature of 3000K.

Further, as shown in FIG. 2, in the present embodiment, by rotating the optical component 30 relative to the light source assembly 10 by 45 degrees (corresponding to the example of the predetermined angle in the present application), it is switchable that the lighted one of the first light source 101 and the second light source 102 will be aligned with and faces the first light exiting portion 301 or the second light exiting portion 302 of the optical component 30.

Specifically, as an example, the first light exiting portion 301 can be fabricated as a scattering portion (e.g., a microlens structure), and the second light exiting portion 302 can be fabricated as a transmitting portion (e.g., a transparent portion), the beam angle of the light beam exited from the scattering portion can be, for example, 40 degrees, and the beam angle of the light beam exited from the transmitting portion can be, for example, 15 degrees.

Although the present application has been described by taking two light sources having two color temperatures as an example, the present application is not limited to the two light sources having different color temperatures, but can also have more than two light sources with different color temperatures or (simultaneously) different colors.

Figure 4:
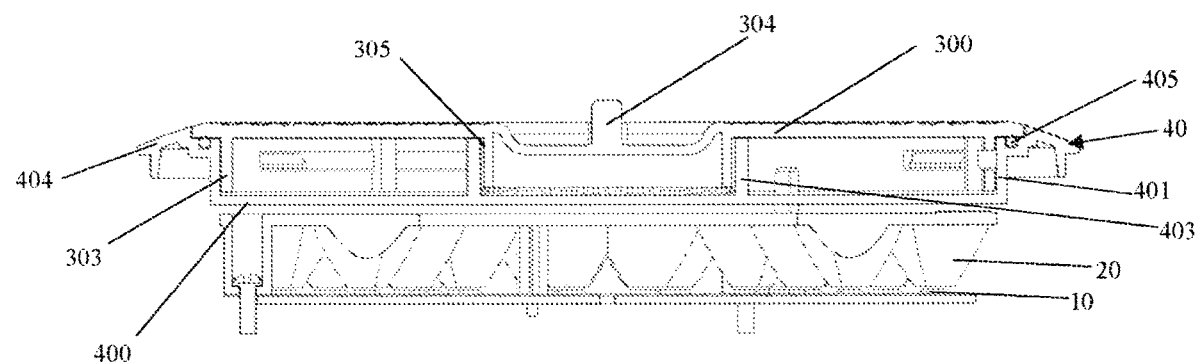
FIG. 4 is a cross-sectional view showing a part of a lighting device according to one embodiment of the present application.

Next, the lighting device 1 according to one embodiment of the present application will be described in further detail with reference to FIG. 3 and FIG. 4, wherein FIG. 4 is a cross-sectional view showing a part of a lighting device according to one embodiment of the present application.

As shown in FIG. 3 and FIG. 4, the optical component 30 can include: a plate-shaped portion 300, the plate-shaped portion 300 has a first surface facing to the lens module 20 and a second surface opposite to the first surface, and the plate-shaped portion 300 includes the first light exiting portion 301 and the second light exiting portion 302, which are alternately arranged in the ring array. Further, the optical component 30 can further include a first peripheral wall 303, which extends toward the lens module 20 on a circumference of the plate-shaped portion 300. According to an embodiment, the optical component 30 can further include a rotary knob portion 304 arranged at the center of the second surface of the plate-shaped portion 300. Therefore, a user can rotate the optical component 30 by operating the rotary knob portion 304, so that one of the scattering portion and the transmitting portion of the optical component 30 is aligned with and faces the turned on light source.

Further, the optical component 30 can further include: a first hollow cylindrical portion 305 arranged at the center of the first surface of the plate-shaped portion 300, and the first hollow cylindrical portion 305 and the rotary knob portion 304 are oppositely arranged on two sides of the plate-shaped portion 300.

Further, as shown in FIG. 3 and FIG. 4, the lighting device 1 according to one embodiment of the present application further includes a supporting member 40 arranged between the lens module 20 and the optical component 30, and the supporting member 40 can be fixed on the lens module 20 by a fixing component, such as a screw.

The supporting member 40 can include: a supporting plate 400 having a first surface and a second surface, wherein the first surface of the supporting plate 400 faces to the lens module 20, and the second surface of the supporting plate 400 is opposite to the first surface of the supporting plate 400, that is, the second surface of the supporting plate 400 faces to the optical component 30; and a second peripheral wall 401, which extends toward an opposite direction of the lens module 20 on the circumference of the supporting plate 400 and is used for surrounding the first peripheral wall 303. The first peripheral wall 303 can abut against the inner surface of the second peripheral wall 401 and cooperate with the second peripheral wall 401, so that the optical component 30 can be rotated relative to the light source assembly 10 by the predetermined angle. As described above, in the present example, the optical component is rotated by 40 degrees, so that the light beam is exited from one of the first light exiting portion 301 and the second light exiting portion 302.

Figure 5:
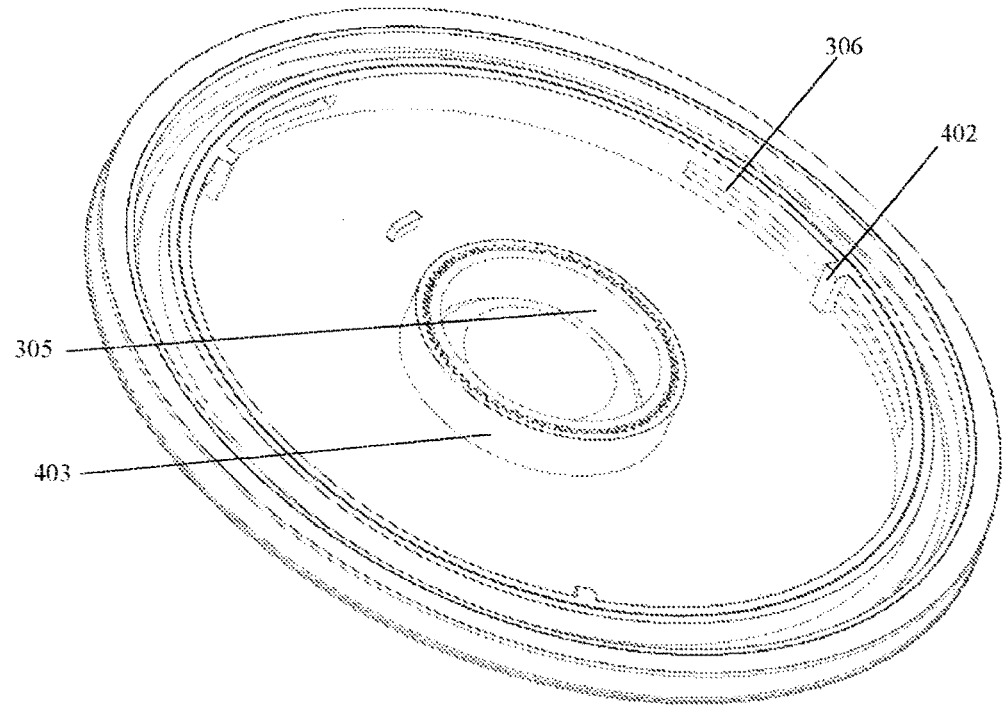
FIG. 5 is a view showing a connection relationship between an optical component and a supporting member.

Further, as an example, as shown in FIG. 3, the first peripheral wall 303 can be provided with a notch 306 with a predetermined length, and the second peripheral wall 401 can be provided with a limiting member 402 (e.g., a buckle), so that the limiting member 402 can move along and within the notch 306 for the predetermined length, and then the optical component 30 can be rotated relative to the light source assembly 10 by the predetermined angle(e.g., 45 degrees in the present example), as shown in FIG. 5. FIG. 5 is a view showing a connection relationship between the optical component 30 and the supporting member 40.

It should be noted that, although the first peripheral wall 303 is provided with the notch and the second peripheral wall 401 is provided with the limiting member in the present embodiment, the present application is not limited to thereto, for example, it can be envisaged that the first peripheral wall 303 is provided with the limiting member and the second peripheral wall 401 is provided with the notch, as long as the optical component 30 can be rotated relative to the light source assembly 10 by the predetermined angle.

By means of the above configuration, the optical component 30 can be precisely rotated, so that one of the first light exiting portion 301 and the second light exiting portion 302 of the optical component 30 is precisely aligned with and faces the turned on light source.

Further, the supporting member 40 can further include: a second hollow cylindrical portion 403 arranged at the center of the second surface of the supporting plate 400, and the first hollow cylindrical portion 305 of the optical component 30 is inserted into the second hollow cylindrical portion 403, as shown in FIG. 4.

Preferably, the outer surface of the peripheral wall of the first hollow cylindrical portion 305 is provided with a first sawtooth portion, the inner surface of the peripheral wall of the second hollow cylindrical portion 403 is provided with a second sawtooth portion, and the first sawtooth portion and the second sawtooth portion can be engaged with each other, as shown in FIG. 5. By means of this configuration, the optical component 30 can be fixed in place after the optical component 30 is rotated by the predetermined angle, so that the optical component 30 can be rotated in this way to switch to a desired beam angle and remain at a desired position.

Further, the supporting member 40 can further include a flange 4044 extending outward from the end portion of the second peripheral wall 401, a groove 405 is arranged at the joint between the flange 404 and the end portion of the second peripheral wall 401, and a sealing ring 406 is arranged in the groove 405 to seal a gap between the optical component 30 and the supporting member 40.

In addition, the lighting device 1 can further include: a shell 2; a switching element 3 arranged on the outer surface of the shell 2, wherein the switching element 3 is electrically connected to the light source assembly 10, so that the at least two light sources can be turned on and turned off independently; and a heat sink 4, wherein the light source assembly 10 is arranged on the heat sink 4, and the peripheral wall of the heat sink 4 can reflect the light beam emitted from the light source assembly 10. In addition, the lighting device 1 can further include a lamp cap 5 to be connected to a power supply socket. As an example, the shell 2 can be a plastic shell.

In the present embodiment, as shown in FIG. 3, the light source assembly 10 is formed by fabricating a plurality of LED chips on a circuit board, and the lens module 20 can include a plurality of lenses corresponding to the plurality of LED chips.

Further, a switch triggered by the switching element 3 can be arranged on the circuit board of the light source assembly 10, so that the at least two light sources are turned on and turned off independently. Here, the switching element 3 can be implemented in the form of a switch slide block, the turn-on and turn-off of the switch on the circuit board are triggered by the switch slide block, and the switch slide block can be assembled on the outer surface of the shell 2 in such a way that a silicone ring is interposed between the switch slide block and the shell. In other embodiments, the turn-on and turn-off of the two light sources can also be controlled by a wall switch or a wireless remote controller.

In the embodiment of the present application, the supporting member 40 is provided to support the optical component 30 to rotate relative to the light source assembly 10 by the predetermined angle, but the present application is not limited to thereto, for example, the supporting member can be omitted, the optical component 30 is supported by the shell 2 to rotate relative to the light source assembly 10 by the predetermined angle, for example, a circumferential position on the inner peripheral wall of the shell 2 corresponding to the assembled optical component 30 can be provided with a limiting member such as a buckle, so that the optical component 30 may be rotated relative to the light source assembly 10 by the predetermined angle.

The specific configuration of the lighting device 1 according to one embodiment of the present application has been described above, and how to operate the lighting device 1 according to one embodiment of the present application to obtain different lighting patterns will be described below.

If the user wants the lighting device 1 to generate light with a color temperature of 3000K, the user can operate the switching element 3 to turn on the second light source 102 with the color temperature of 3000K; and if the user wants the lighting device 1 to generate light with a color temperature of 5000K, the user can operate the switching element 3 to turn on the first light source 102 with the color temperature of 5000K. If the user wants the lighting device 1 to generate a light beam with a larger beam angle, the user can operate the rotary knob portion 304 to rotate the optical component 30, so that the scattering portion of the optical component 30 is aligned with and faces the turned on light source, and if the user wants the lighting device 1 to generate a light beam with a smaller beam angle, the user can operate the rotary knob portion 304 to rotate the optical component 30, so that the transmitting portion of the optical component 30 is aligned with and faces the turned on light source.

As an example, if the user wants the lighting device 1 to generate a light spot with a color temperature of 3000K and a beam angle of 15°, the user can operate the switching element 3 to turn on the second light source 102 with the color temperature of 3000K, and operate the rotary knob portion 304 to rotate the optical component 30 so that the transmitting portion of the optical component 30 is aligned with and faces the turned on second light source 102. If the user wants the lighting device 1 to generate a light spot with a color temperature of 5000K and a beam angle of 15°, the user can operate the switching element 3 to turn on the first light source 101 with the color temperature of 5000K, and operate the rotary knob portion 304 to rotate the optical component 30, so that the transmitting portion of the optical component 30 is aligned with and faces the turned on first light source 101. If the user wants the lighting device 1 to generate a light spot with a color temperature of 3000K and a beam angle of 40°, the user can operate the switching element 3 to turn on the second light source 102 with the color temperature of 3000K, and operate the rotary knob portion 304 to rotate the optical component 30 so that the scattering portion of the optical component 30 is aligned with and faces the turned on second light source 102. If the user wants the lighting device 1 to generate a light spot with a color temperature of 5000K and a beam angle of 40°, the user can operate the switching element 3 to turn on the first light source 101 with the color temperature of 5000K, and operate the rotary knob portion 304 to rotate the optical component 30, so that the scattering portion of the optical component 30 is aligned with and faces the turned on first light source 101.

Figure 6A:
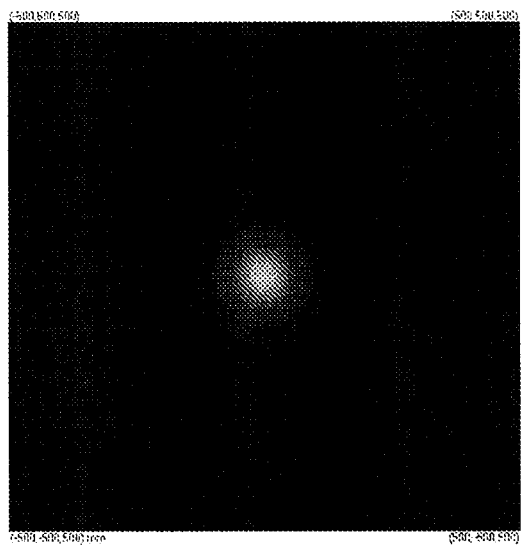
FIG. 6A to FIG. 6D show pictures of light emitting patterns of a lighting device according to one embodiment of the present application at different color temperatures and different beam angles.
Figure 6B:
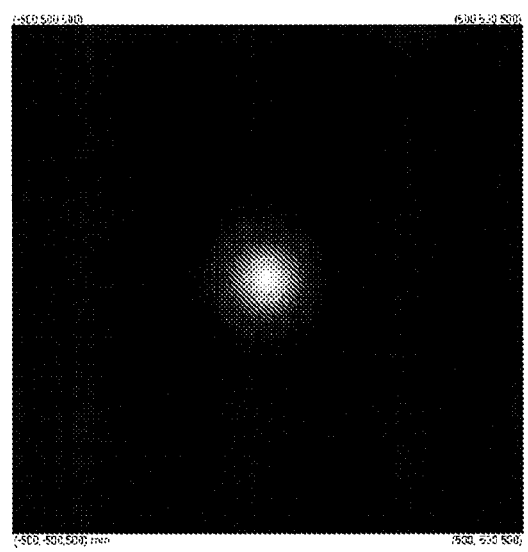
Figure 6C:
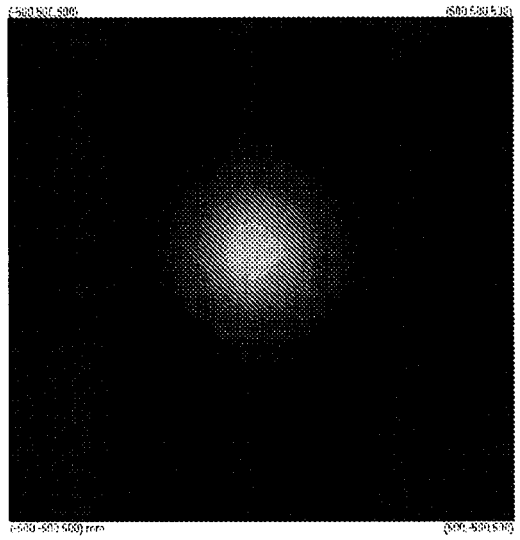
Figure 6D:
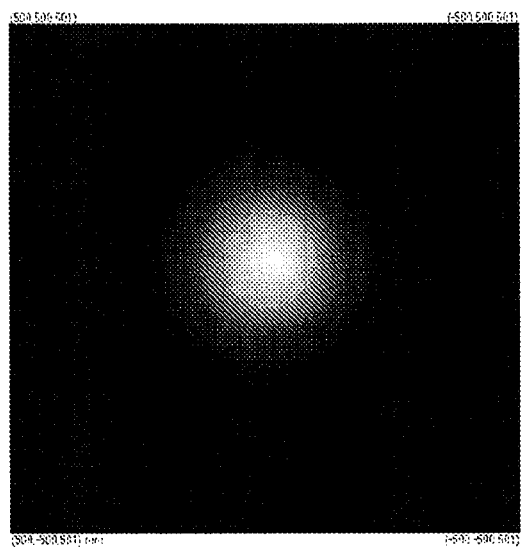

FIG. 6A to FIG. 6D show pictures of light emitting patterns of a lighting device according to one embodiment of the present application at different color temperatures and different beam angles. FIG. 6A shows a light spot with a color temperature of 3000K and a beam angle of 15° at a distance of 0.5 m from the lighting device, FIG. 6B shows a light spot with a color temperature of 5000K and a beam angle of 15° at a distance of 0.5 m from the lighting device, FIG. 6C shows a light spot with a color temperature of 3000K and a beam angle of 40° at a distance of 0.5 m from the lighting device, and FIG. 6D shows a light spot with a color temperature of 5000K and a beam angle of 40° at a distance of 0.5 m from the lighting device.

Accordingly, the lighting device according to the present application can simultaneously realize desired beam angle/CCT changes with a simple structure, so as to meet the requirements of people for multiple change selecting on combinations of CCTs and beam angles.

The above description takes the example that the light source assembly of the lighting device has 8 light source groups and the 8 light source groups are divided into two light sources with different color temperatures, but the light source assembly of the present application can include more than two light sources. Therefore, when the light source assembly includes M light source groups arranged in a ring array and includes N light sources, each light source includes M/N light source groups and is alternately arranged, wherein N is greater than or equal to 2, M/N is an integer, and the optical component can be rotated relative to the light source assembly by an angle of 360 degrees divided by M, so that the light beam is exited from one of the first light exiting portion and the second light exiting portion.

As described above, the lighting device of the present application switches multiple color temperatures and multiple beam angles on a single lighting device by simply rotating the optical component and switching the switching element on the shell of the lighting device, so that the number of lighting solutions that can be selected by the user from a single lighting device is doubled, for example, 2 color temperatures and 2 beam angles will provide the user with 4 combinations for selection.

Although different examples have been shown and described, the present application is not limited thereto, and is to be understood to include all such modifications and variations that are apparent to those skilled in the art.

The invention claimed is:

1. A lighting device, comprising:
    a light source assembly, having at least two light sources, wherein the at least two light sources have different light emitting characteristics, and can be turned on and turned off independently to emit a light beam by one light source of the at least two light sources;
    a lens module, arranged on a light path of the light beam to receive the light beam from the one light source; and
    an optical component, arranged on the light path of the light beam to receive the light beam from the lens module,
    wherein the optical component has a first light exiting portion, a second light exiting portion, and a rotary knob portion, and
    wherein the optical component is movable relative to the light source assembly by turning the rotary knob portion, so that the light beam is exited from one of the first light exiting portion and the second light exiting portion, and a beam angle of the light beam exited from the first light exiting portion is different from the beam angle of the light beam exited from the second light exiting portion.

2. The lighting device according to claim 1, wherein the optical component comprises: a plate-shaped portion, the plate-shaped portion has a first surface facing to the lens module and a second surface opposite to the first surface, and the plate-shaped portion comprises the first light exiting portion and the second light exiting portion, which are alternately arranged in the ring array.

3. The lighting device according to claim 2, wherein the optical component further comprises a first peripheral wall, which extends toward the lens module on a circumference of the plate-shaped portion.

4. The lighting device according to claim 3, wherein the rotary knob portion is arranged at the center of the second surface of the plate-shaped portion.

5. The lighting device according to claim 4, wherein the optical component further comprises: a first hollow cylindrical portion arranged at the center of the first surface of the plate-shaped portion, and the first hollow cylindrical portion is opposite to the rotary knob portion.

6. The lighting device according to claim 5, further comprising:
a supporting member arranged between the lens module and the optical component, and the supporting member comprises:
a supporting plate having a first surface and a second surface, wherein the first surface of the supporting plate faces to the lens module, and the second surface of the supporting plate is opposite to the first surface of the supporting plate; and
a second peripheral wall, which extends toward an opposite direction of the lens module on the circumference of the supporting plate and is used for surrounding the first peripheral wall, wherein the first peripheral wall abuts against the inner surface of the second peripheral wall and cooperates with the second peripheral wall, so that the optical component is rotated relative to the light source assembly by the predetermined angle, and the light beam is exited from one of the first light exiting portion and the second light exiting portion.

7. The lighting device according to claim 6, wherein the supporting member further comprises: a second hollow cylindrical portion arranged at the center of the second surface of the supporting plate, and the first hollow cylindrical portion is inserted into the second hollow cylindrical portion.

8. The lighting device according to claim 7, wherein the outer surface of the peripheral wall of the first hollow cylindrical portion is provided with a first sawtooth portion, the inner surface of the peripheral wall of the second hollow cylindrical portion is provided with a second sawtooth portion, and the first sawtooth portion and the second sawtooth portion can be engaged with each other.

9. The lighting device according to claim 6, wherein one of the first peripheral wall and the second peripheral wall is provided with a limiting member, and the other of the first peripheral wall and the second peripheral wall is provided with a notch with a predetermined length, so that the limiting member can move along and within the notch for the predetermined length, and thereby the optical component is rotated relative to the light source assembly by the predetermined angle.

10. The lighting device according to claim 6, wherein the supporting member further comprises a flange extending outward from the end portion of the second peripheral wall, a groove is arranged at the joint between the flange and the end portion of the second peripheral wall, and a sealing ring is arranged in the groove.

11. The lighting device according to claim 1, wherein the at least two light sources have different color temperatures.

12. The lighting device according to claim 11, wherein the at least two light sources comprise a first light source and a second light source, the first light source has a first color temperature, the second light source has a second color temperature that is different from the first color temperature, and the first light source and the second light source are alternately arranged in a ring array.

13. The lighting device according to claim 12, wherein the optical component can be rotatable relative to the light source assembly by a predetermined angle, and at the predetermined angle, the turned on one of the first light source and the second light source is aligned with one of the first light exiting portion and the second light exiting portion of the optical component.

14. The lighting device according to claim 13, wherein the first light exiting portion is a scattering portion, and the second light exiting portion is a transmitting portion.

15. The lighting device according to claim 1, further comprising a shell, wherein the light source assembly, the lens module and the optical component are accommodated in the shell.

16. The lighting device according to claim 15, wherein the shell supports the optical component to rotate relative to the light source assembly.

17. The lighting device according to claim 15, wherein a switching element is arranged on the outer surface of the shell, and the switching element is electrically connected to the light source assembly, so that the at least two light sources can be turned on and turned off independently.

18. The lighting device according to claim 1, wherein the lighting device further comprises a heat sink, the light source assembly is arranged on the heat sink, and the peripheral wall of the heat sink can reflect the light beam emitted from the light source assembly.

19. The lighting device according to claim 1, wherein the light source assembly comprises M light source groups arranged in a ring array, the at least two light sources include N light sources, each light source comprises M/N light source groups and is alternately arranged, wherein N is greater than or equal to 2, M/N is an integer, and the optical component can be rotatable relative to the light source assembly by an angle of 360 degrees divided by M, so that the light beam is exited from one of the first light exiting portion and the second light exiting portion.

20. A lighting device, comprising:
a light source assembly having at least two light sources with different color temperature, which can be turned on and turned off independently to emit a light beam respectively;
a lens, arranged on a light path of the light beam to receive the light beam from the one light source; and
an optical component, arranged on the light path of the light beam to receive the light beam from the lens,
wherein the optical component has a first light exiting portion, a second light exiting portion, and a rotary knob portion, and
wherein the optical component is movable relative to the light source assembly by turning the rotary knob portion, the light beam exited from one of the first light exiting portion has different beam angle from light beam exited from the second light exiting portion.

* * * * *